United States Patent
Nishida et al.

(10) Patent No.: US 11,879,553 B2
(45) Date of Patent: Jan. 23, 2024

(54) STEAM VALVE AND POWER GENERATION SYSTEM

(71) Applicant: Mitsubishi Power, Ltd., Yokohama (JP)

(72) Inventors: Shingo Nishida, Tokyo (JP); Megumu Tsuruta, Tokyo (JP); Fumiyuki Suzuki, Yokohama (JP); Masaki Hata, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 349 days.

(21) Appl. No.: 17/414,438

(22) PCT Filed: Dec. 26, 2019

(86) PCT No.: PCT/JP2019/051165
§ 371 (c)(1),
(2) Date: Jun. 16, 2021

(87) PCT Pub. No.: WO2020/138307
PCT Pub. Date: Jul. 2, 2020

(65) Prior Publication Data
US 2022/0082169 A1    Mar. 17, 2022

(30) Foreign Application Priority Data

Dec. 28, 2018  (JP) ................................ 2018-247066

(51) Int. Cl.
*F16K 1/44*    (2006.01)
*F01D 17/14*    (2006.01)
(Continued)

(52) U.S. Cl.
CPC .............. *F16K 1/44* (2013.01); *F01D 17/145* (2013.01); *F01D 25/04* (2013.01); *F16K 1/52* (2013.01)

(58) Field of Classification Search
CPC . F16K 1/44; F16K 1/443; F16K 1/482; F16K 39/024; F17D 17/145; Y10T 137/8803; Y10T 137/86976
See application file for complete search history.

(56) References Cited

U.S. PATENT DOCUMENTS 2,333,455 A * 11/1943 Warren .................... F16K 29/00
                                                          277/411
4,269,227 A *  5/1981 Araki ......................... F16K 1/44
                                                          137/630.14
(Continued)

FOREIGN PATENT DOCUMENTS

JP      S54-111127 A      8/1979
JP      S60-195906 U     12/1985
(Continued)

OTHER PUBLICATIONS

International Search Report dated Feb. 18, 2020, issued in counterpart Application No. PCT/JP2019/051165, with English translation. (4pages).

(Continued)

*Primary Examiner* — Reinaldo Sanchez-Medina
(74) *Attorney, Agent, or Firm* — WHDA, LLP

(57) ABSTRACT

A steam valve having a first inclined surface, which is formed at the distal end portion of a valve rod and in which the outer diameter of the valve rod increases from the distal end toward the base end of the valve rod, and a second inclined surface, which is formed on the inside of a portion of a main valve that is positioned on the base-end side of the valve rod and which inclines with the same inclination angle as the first inclined surface. In a state in which a slave valve and the main valve are closed the first inclined surface and the second inclined surface are separated from each other, and when the slave valve and the main valve are in a fully (Continued)

open state the first inclined surface and the second inclined surface abut each other.

7 Claims, 11 Drawing Sheets

(51) Int. Cl.
  *F01D 25/04* (2006.01)
  *F16K 1/52* (2006.01)

(56) References Cited

U.S. PATENT DOCUMENTS

| | | | | | |
|---|---|---|---|---|---|
| 4,384,593 | A | * | 5/1983 | Keller | F16K 47/02 |
| | | | | | 251/24 |
| 4,481,776 | A | * | 11/1984 | Araki | F01D 17/145 |
| | | | | | 137/614.19 |
| 4,986,309 | A | * | 1/1991 | Bellanca | F01D 17/145 |
| | | | | | 137/630.14 |
| 5,119,859 | A | * | 6/1992 | Sato | F01D 17/145 |
| | | | | | 137/630.14 |
| 2008/0011976 | A1 | | 1/2008 | Scarlin | |
| 2013/0015387 | A1 | | 1/2013 | Biwanski et al. | |
| 2019/0178388 | A1 | * | 6/2019 | Hata | F16K 15/063 |

FOREIGN PATENT DOCUMENTS

| | | |
|---|---|---|
| JP | 2008-025571 A | 2/2008 |
| JP | 2014-070513 A | 4/2014 |
| JP | 2015-081568 A | 4/2015 |

OTHER PUBLICATIONS

Written Opinion dated Feb. 18, 2020, issued in counterpart Application No. PCT /JP2019/051165, with English translation. (11 pages).

* cited by examiner

STEAM VALVE AND POWER GENERATION SYSTEM

TECHNICAL FIELD

The present invention relates to a steam valve and a power generation system.

Priority is claimed on Japanese Patent Application No. 2018-247066 filed on Dec. 28, 2018, the contents of which are incorporated herein by reference.

BACKGROUND ART

Power generation systems include a steam turbine and a steam valve for adjusting the amount of steam depending on a load change and shutting off the supply of steam at the time of an abnormality.

The steam valve has a valve seat having an opening portion, a valve rod that moves a valve body provided to face the opening portion of the valve seat in a direction of contacting and separating from the valve seat, and a cylindrical support member that slidably supports the valve rod. In the steam valve having such a configuration, it is important to suppress wear due to the rotation, rattling, or the like of the valve body resulting from the steam.

Patent Document 1 discloses a steam valve (main steam stop valve) for a steam turbine in which a planar surface of a valve body (a surface parallel to an axis direction of a valve rod) and a planar surface of the valve rod (a surface parallel to the axis direction of the valve rod) are brought into surface contact with each other in a fitting portion between the valve body and the valve rod.

CITATION LIST

Patent Literature

[PTL 1] Japanese Unexamined Patent Application Publication No. 2014-70513

SUMMARY OF INVENTION

Technical Problem

Meanwhile, the stop valve constituting the steam valve may include the valve rod, a slave valve disposed at a tip of the valve rod, and a main valve formed with a through-hole through which steam flows when the slave valve is opened (a configuration corresponding to the valve body disclosed in Patent Document 1).

Such a steam valve is configured such that the main valve is opened by utilizing the force of steam guided to the through-hole as the slave valve is opened together with an actuator earlier than the main valve.

In the steam valve having the above configuration, from the viewpoint of suppressing the wear of the stop valve, it is important to support the main valve so as to prevent the main valve from rotating or rattling with respect to the valve rod in a state in which the slave valve and the main valve are open.

However, in the technique disclosed in Patent Document 1, the steam valve is configured such that the planar surfaces of the valve rod and the valve body are engaged with each other so as to be in contact with each other in the fitting portion between the valve rod and the valve body. Therefore, in a state in which the slave valve and the main valve are fully opened, it was difficult to support the main valve so as to prevent the main valve from rotating or rattling with respect to the valve rod.

That is, in the technique disclosed in Patent Document 1, it is difficult to suppress the wear of the stop valve when the slave valve and the main valve are in the fully opened state.

Thus, an object of the present invention is to provide a steam valve and a power generation system capable of suppressing the wear of a stop valve when a slave valve and a main valve are in a fully opened state.

Solution to Problem

In order to solve the above problems, according to a steam valve according to one aspect of the present invention, the steam valve includes a valve body having a steam flow path through which steam flows, and a valve seat that is provided in the middle of the steam flow path and has an opening portion, and a stop valve having a valve rod that extends in an axis direction in which an axis extends and is movable forward and backward in the axis direction, a slave valve that is provided at a tip of the valve rod in a tip portion of the valve rod, and a main valve that includes a penetrating portion, into which a portion located closer to a base end side of the valve rod than the tip is inserted, in the tip portion of the valve rod, closes the steam flow path by abutting against the valve seat, and is formed with a through-hole into which the steam flows when the slave valve is opened. The main valve functions as a valve seat of the slave valve, is not fixed to the valve rod, and is configured to be movable forward and backward in the axis direction. A first inclined surface is formed on the tip portion of the valve rod so that an outer diameter of the valve rod is increased from a tip side of the valve rod toward a base end side of the valve rod. A second inclined surface that is inclined at the same inclination angle as the first inclined surface is formed inside a portion of the main valve located on the base end side of the valve rod. The first inclined surface and the second inclined surface are separated from each other in a state in which the slave valve and the main valve are closed. The first inclined surface and the second inclined surface abut against each other when the slave valve and the main valve are in a fully opened state.

According to the present invention, the steam valve has the first inclined surface which is formed on an outer peripheral surface of the valve rod and on which the outer diameter of the valve rod is increased from the tip side of the valve rod toward the base end side thereof, and the second inclined surface which is formed inside the main valve located on the base end side of the valve rod and inclined at an inclination angle having the same magnitude as the inclination angle of the first inclined surface, and is configured such that the first inclined surface and the second inclined surface are separated from each other in a state where the slave valve and the main valve are closed and the first inclined surface and the second inclined surface abut against each other in a state where the slave valve and the main valve are in a fully opened state. Accordingly, when the slave valve and the main valve are fully opened, the main valve can be supported by the first inclined surface in a state where the axis of the valve rod and the axis of the penetrating portion are made to coincide with the axis.

Accordingly, since it is possible to suppress the sliding of the main valve with respect to the valve rod in the axis direction, the wear of the stop valve can be suppressed.

Additionally, in the steam valve according to the aspect of the present invention, the first inclined surface may be one tapered surface that is formed continuously with respect to a circumferential direction of the valve rod, and the second inclined surface may be one tapered surface that is formed continuously with respect to a circumferential direction of the main valve.

In this way, by using one tapered surface formed continuously in the circumferential direction of the valve rods the first inclined surface and using one tapered surface formed continuously in the circumferential direction of the main valve as the second inclined surface, it is possible to suppress the sliding of the main valve with respect to the valve rod in the axis direction. Thus, the wear of the stop valve can be suppressed.

Additionally, in the steam valve according to the aspect of the present invention, the first inclined surface may have at least one pair of first inclined planar portions that is disposed with the axis interposed therebetween, and the second inclined surface may have a pair of second inclined planar portions that abut against the pair of the first inclined planar portions when the slave valve and the main valve are in a fully opened state.

In this way, the first inclined surface has at least one pair of first inclined planar portions that is disposed with the axis interposed therebetween, and the pair of the first inclined planar portions and the pair of second inclined planar portions are configured to abut against each other when the slave valve and the main valve are in the fully opened state. Accordingly, it is possible to suppress the sliding of the main valve with respect to the valve rod in the axis direction, and it is possible to suppress the rotation of the main valve with respect to the valve rod. Accordingly, the wear of the stop valve can be further suppressed.

Additionally, in the steam valve according to one aspect of the present invention, the main valve may have a main valve body that abuts against the valve seat, and a tubular bush that is disposed inside the main valve body, and the second inclined surface may be formed on the bush.

In this way, the second inclined surface may be formed on the tubular bush disposed inside the main valve body.

Additionally, in the steam valve according to the aspect of the present invention, the stem valve may further include a compression coil spring that is provided between the slave valve and the main valve in the axis direction, and one end of the compression coil spring in the axis direction may be connected to the slave valve and the other end thereof in the axis direction is connected to the main valve.

By having the compression coil spring having such a configuration, it is possible to continue applying a force in a direction in which the main valve is separated from the slave valve (a direction from the slave valve to the main valve).

Accordingly, when the slave valve and the main valve are fully opened, the first inclined surface and the second inclined surface firmly abut against each other in a state in which the axis of the valve rod and the axis of the opening portion are made to coincide with each other. Thus, the wear suppression effect of the stop valve can be enhanced.

Additionally, in the steam valve according to one aspect of the present invention, the main valve may have a main valve body that abuts against the valve seat, and a tubular bush that is disposed inside the main valve body, the second inclined surface may be formed on the bush, and the other end of the compression coil spring in the axis direction may be connected to the bush.

In this way, the compression coil spring may be disposed between the slave valve and the bush, and the other end of the compression coil spring in the axis direction may be connected to the bush.

Additionally, in the steam valve according to one aspect of the present invention, the slave valve may be fixed to the tip of the valve rod.

By fixing the slave valve to the tip of the valve rod in this way, it is possible to suppress that the slave valve rattles or rotates with respect to the valve rod. Accordingly, the wear between the slave valve and the valve rod (the wear of the stop valve) can be suppressed.

Additionally, in the steam valve according to the aspect of the present invention, the steam valve may further include a control valve that is disposed to face the stop valve in the axis direction and is capable of abutting against the valve seat at a position outside a position of the valve seat against which the main valve abuts.

In this way, the above-described stop valve may be applied to the steam valve in which the control valve is disposed outside the stop valve.

In order to solve the above problems, a power generation system according to another aspect of the present invention includes the steam valve; a boiler that generates steam; a steam turbine that is driven by the steam; and a steam supply pipe that connects the boiler and the steam turbine to each other and supplies the steam to the steam turbine. The steam valve is provided in the steam supply pipe.

According to the present invention, the maintenance frequency of the steam valve can be reduced by the power generation system including the steam valve capable of suppressing the wear of the stop valve. Therefore, the operation efficiency of the power generation system can be improved.

Advantageous Effects of Invention

According to the present invention, the wear of the stop valve can be suppressed when the slave valve and the main valve are fully opened.

DESCRIPTION OF EMBODIMENTS

Hereinafter, embodiments to which the present invention is applied will be described in detail with reference to the drawings.

First Embodiment

Figure 1:
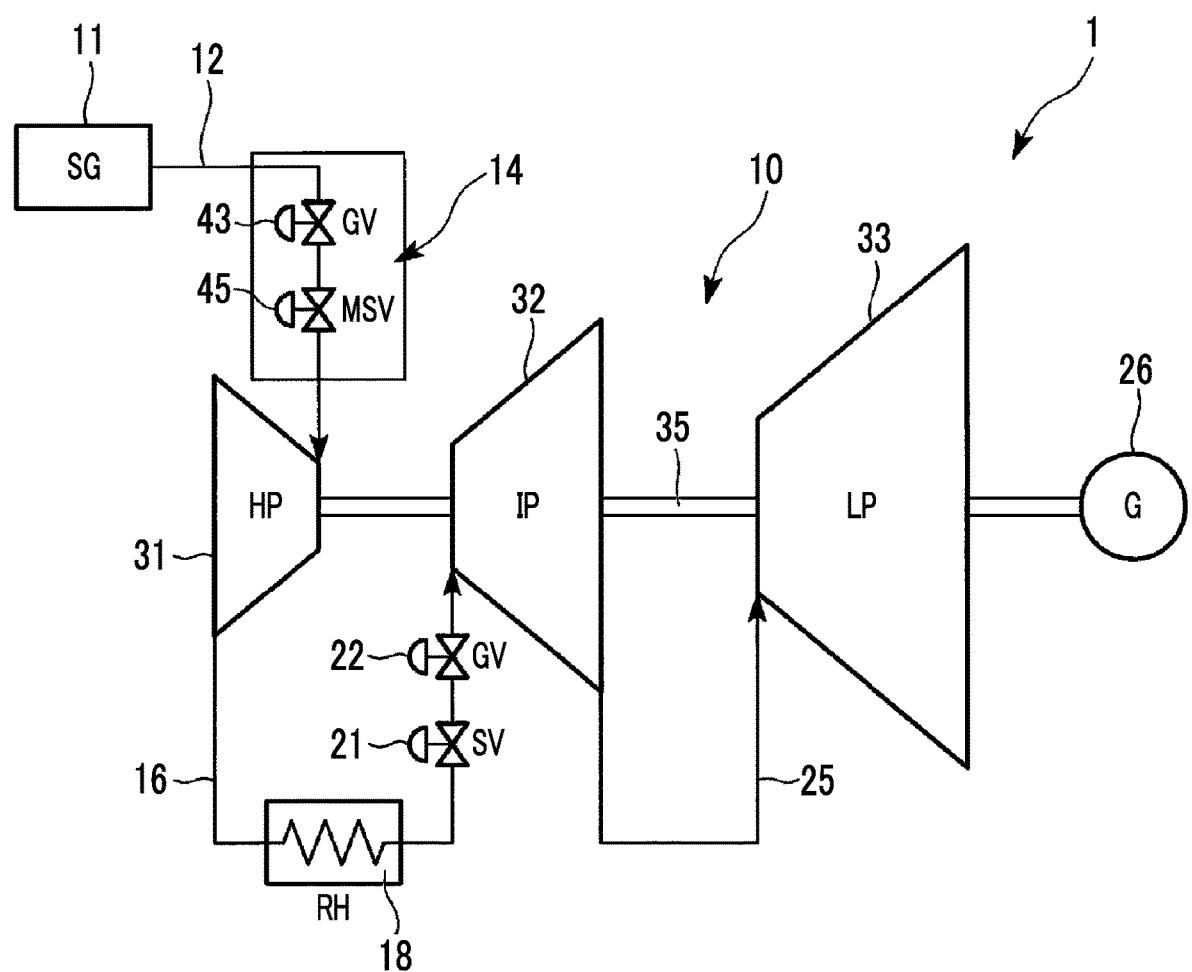
FIG. 1 is a system diagram illustrating a schematic configuration of a power generation system according to a first embodiment of the present invention.

A power generation system 1 to which a steam valve according to a first embodiment of the present invention is applied will be described with reference to FIG. 1.

The power generation system 1 includes a steam turbine 10, a boiler 11, a first steam supply pipe 12 (steam supply pipe), a steam valve 14 including a control valve 43 and a stop valve 45, a second steam supply pipe 16, a reheater 18, a stop valve 21, a control valve 22, a third steam supply pipe 25, and a generator 26.

The steam turbine 10 has a high-pressure steam turbine 31, a medium-pressure steam turbine 32, and a low-pressure steam turbine 33. The medium-pressure steam turbine 32 is disposed between the high-pressure steam turbine 31 and the low-pressure steam turbine 33.

The high-pressure steam turbine 31, the medium-pressure steam turbine 32, and the low-pressure steam turbine 33 have a rotor shaft 35 that extends in one direction. The rotor shaft 35 is formed with a rotor shaft body and a plurality of rotor blades (not illustrated).

The rotor shaft 35 is rotated by the steam supplied to the high-pressure steam turbine 31, the medium-pressure steam turbine 32, and the low-pressure steam turbine 33 to generate electricity.

The boiler 11 is connected to one end of the first steam supply pipe 12. The boiler 11 generates high-pressure steam (hereinafter, referred to as "high-pressure steam"). The high-pressure steam generated by the boiler 11 is supplied into the first steam supply pipe 12.

The other end of the first steam supply pipe 12 is connected to an inlet of the high-pressure steam turbine 31. The first steam supply pipe 12 is a pipe for guiding the high-pressure steam generated by the boiler 11 to the high-pressure steam turbine 31.

Figure 2:
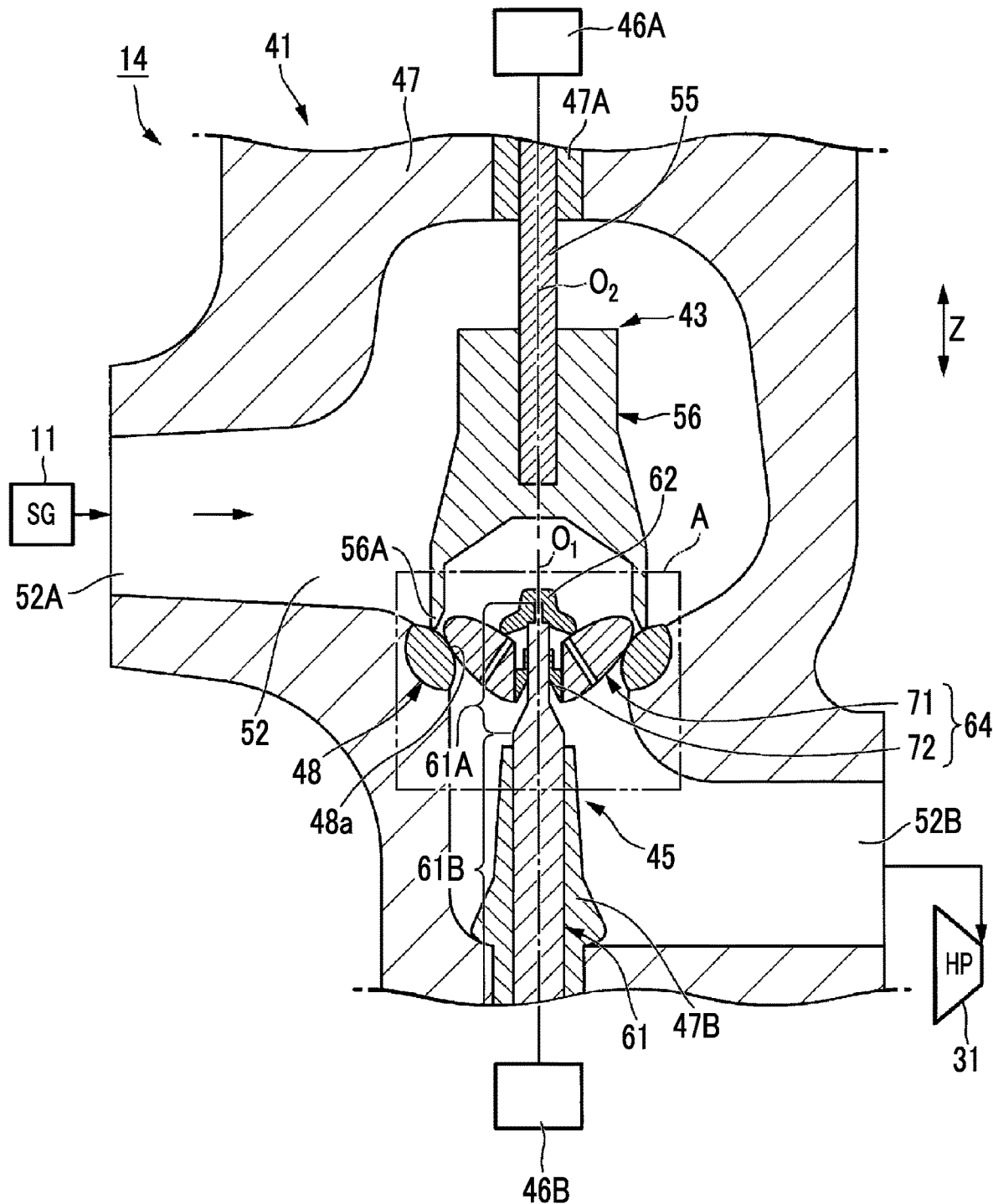
FIG. 2 is an enlarged cross-sectional view of a steam valve illustrated in FIG. 1, which schematically illustrates a state in which a slave valve, a main valve, and a control valve are fully closed.

Next, the steam valve 14 will be described with reference to FIGS. 2 to 7. In FIG. 2, A indicates a region (hereinafter, referred to as "region A"), $O_1$ indicates an axis of a valve rod 61 constituting the stop valve 45 (hereinafter, referred to as an "axis $O_1$"), $O_2$ indicates an axis of a valve rod 55 constituting the control valve 43 (hereinafter, referred to as an "axis $O_2$"), and Z indicates a direction in which the axes $O_1$ and $O_2$ extend (hereinafter, referred to as an "axis direction Z").

Figure 3:
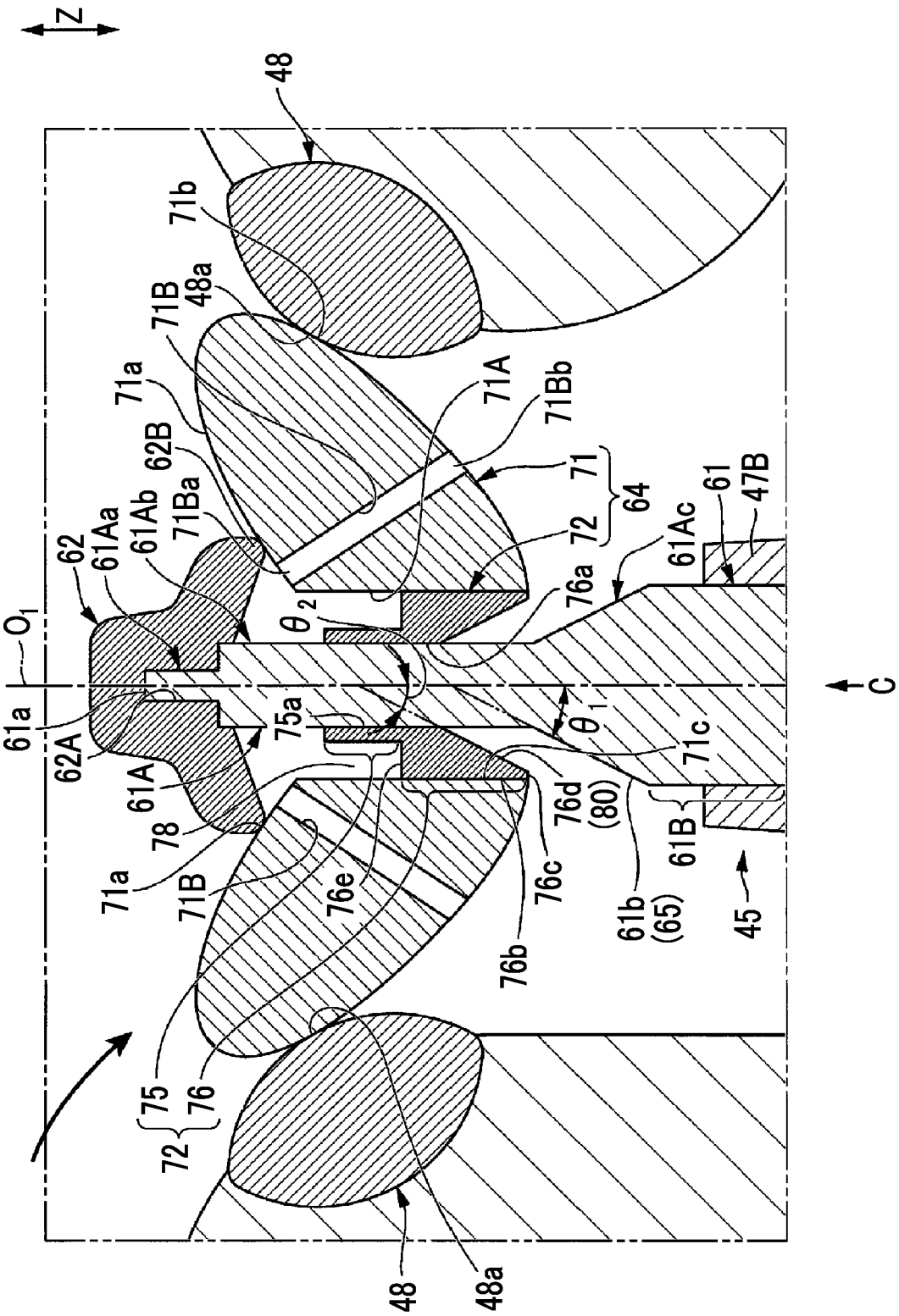
FIG. 3 is an enlarged cross-sectional view of a portion of the steam valve illustrated in FIG. 2 surrounded by a region A (excluding the control valve).

In FIG. 3, el is an inclination angle of a first inclined surface 61b with respect to the axis $O_1$ (hereinafter, referred to as an "inclination angle $\theta_1$"), and $\theta_2$ is an inclination angle of a second inclined surface 76d with respect to the axis $O_1$ (hereinafter, referred to as an "inclination angle $\theta_2$").

In FIGS. 1 to 7, the same components are designated by the same reference numerals.

The steam valve 14 is provided in the first steam supply pipe 12. The steam valve 14 includes a valve body 41, the control valve 43, a stop valve 45, and actuators 46A and 46B.

The valve body 41 has a flow path partition portion 47 and a valve seat 48.

The flow path partition portion 47 partitions the steam flow path 52, and accommodates a part of the control valve 43 (tip side) and a part of the stop valve 45 (tip side).

The steam flow path 52 has an inlet 52A and an outlet 52B. The inlet 52A of the steam flow path 52 is connected to the boiler 11 via one side of the first steam supply pipe 12. The high-pressure steam generated by the boiler 11 is introduced into the inlet 52A of the steam flow path 52.

The outlet 52B of the steam flow path 52 is connected to the high-pressure steam turbine 31 via the other side of the first steam supply pipe 12.

In a state in which the stop valve 45 is open, the high-pressure steam turbine 31 is supplied with high-pressure steam of which the flow rate is adjusted by the control valve 43.

The flow path partition portion 47 includes a first guide member 47A and a second guide member 47B.

The first guide member 47A is provided so as to cover an outer peripheral surface of the portion of the valve rod 55 constituting the control valve 43, which is not exposed to the steam flow path 52. The first guide member 47A functions as a guide that guides the valve rod 55 in the axis direction Z.

The second guide member 47B is provided so as to cover an outer peripheral surface of a rod-shaped portion 61B constituting the stop valve 45. The second guide member 47B functions as a guide that guides the valve rod 61 in the axis direction Z.

The valve seat 48 is provided in a flow path partition portion 47 located in the middle of the steam flow path 52. The shape of the valve seat 48 is a ring shape around the axis $O_1$. The axis of the valve seat 48 coincides with the axis $O_1$.

The valve seat 48 has a valve seat surface 48a exposed to the steam flow path 52. The valve seat surface 48a is a curved surface. A main valve 64 constituting the stop valve 45 and a tip 56A of the control valve body 56 constituting the control valve 43 abuts against the valve seat surface 48a.

The control valve 43 is disposed on the upstream side of a position where the stop valve 45 is disposed in a flow direction of the steam. The control valve 43 has the valve rod 55 and the control valve body 56.

The valve rod 55 extends in the axis direction Z, and a tip side thereof is disposed in the steam flow path 52. The axis $O_1$ of the valve rod 55 coincides with the axis $O_2$ of the valve rod 55 of the stop valve 45. The valve rod 55 is configured to be movable in the axis direction Z.

The control valve body 56 is provided at a tip portion of the valve rod 55. The portion of the control valve body 56 located on the valve seat 48 side has a tubular shape. The control valve body 56 has the tip 56A that abuts against the valve seat surface 48a of the valve seat 48.

The control valve 43 having the above configuration controls the flow rate of the high-pressure steam supplied to the high-pressure steam turbine 31 depending on the load of the steam turbine 10.

The stop valve 45 is disposed inside the control valve 43. The stop valve 45 has the valve rod 61, a slave valve 62, and the main valve 64.

The valve rod 61 extends in the axis direction Z and has a tip portion 61A and a rod-shaped portion 61B. Tip sides of the tip portion 61A and the rod-shaped portion 61B are disposed in the steam flow path 52.

The tip portion 61A has a first valve rod portion 61Aa including a tip surface 61a, a second valve rod portion 61Ab, and a third valve rod portion 61Ac.

The first valve rod portion 61Aa has a columnar shape and is configured to have an outer diameter smaller than that of the second portion. The outer diameter of the first valve rod portion 61Aa has a constant size in the axis direction Z.

The second valve rod portion 61Ab is disposed between the first valve rod portion 61Aa and the third valve rod portion 61Ac in the axis direction Z. The second valve rod portion 61Ab is configured integrally with the first and third valve rod portions 61Aa and 61Ac.

The outer shape of the second valve rod portion 61Ab has a columnar shape. The outer diameter of the second valve rod portion 61Ab has a constant size in the axis direction Z.

The third valve rod portion 61Ac is disposed between the second valve rod portion 61Ab and the rod-shaped portion 61B in the axis direction Z. The third valve rod portion 61Ac is configured integrally with the second valve rod portion 61Ab and the rod-shaped portion 61B.

The outer shape of the third valve rod portion 61Ac has a truncated cone shape. The third valve rod portion 61Ac has the first inclined surface 61b on which the outer diameter of the third valve rod portion 61Ac is increased from a tip side of the valve rod 61 toward a base end side of the valve rod.

The first inclined surface 61b is one tapered surface 65 that is formed continuously with respect to the circumferential direction of the valve rod 61. The first inclined surface 61b is inclined such that an angle with respect to the axis $O_1$ is an inclination angle $\theta_1$.

The rod-shaped portion 61B extends in the axis direction Z and includes a base end portion. A base end side of the rod-shaped portion 61B is connected to the actuator 46B.

The valve rod 61 having the above configuration is configured to be movable forward and backward in the axis direction Z.

The slave valve 62 has a recessed portion 62A and an abutment part 62B.

The recessed portion 62A has a shape that allows the first valve rod portion 61Aa to be fitted thereinto. The slave valve 62 is fixed to the first valve rod portion 61Aa (the tip of the valve rod 61) of the valve rod 61 by fitting the recessed portion 62A and the first valve rod portion 61Aa to each other.

In this way, by fitting the first valve rod portion 61Aa of the valve rod 61 into the recessed portion 62A formed in the slave valve 62, the slave valve 62 is fixed to the valve rod 61. Therefore, it is possible to suppress that the slave valve 62 rattles or rotates with respect to the valve rod 61. Accordingly, the wear between the slave valve 62 and the valve rod 61 (the wear of the stop valve 45) can be suppressed.

The abutment part 62B constitutes an outer peripheral portion of the slave valve 62. The abutment part 62B extends obliquely downward. The abutment part 62B has a ring shape.

In a state in which the slave valve 62 is closed (the state illustrated in FIGS. 2 and 3), the abutment part 62B abuts against the surface of the valve seat surface 71a of the main valve body 71 constituting the main valve 64, which is located outside the through-hole 71B.

In this state, since the inlet 71Ba of the through-hole 71B is isolated from the steam flow path 52 through which the high-pressure steam flows, the high-pressure steam does not flow through the through-hole 71B.

Figure 4:
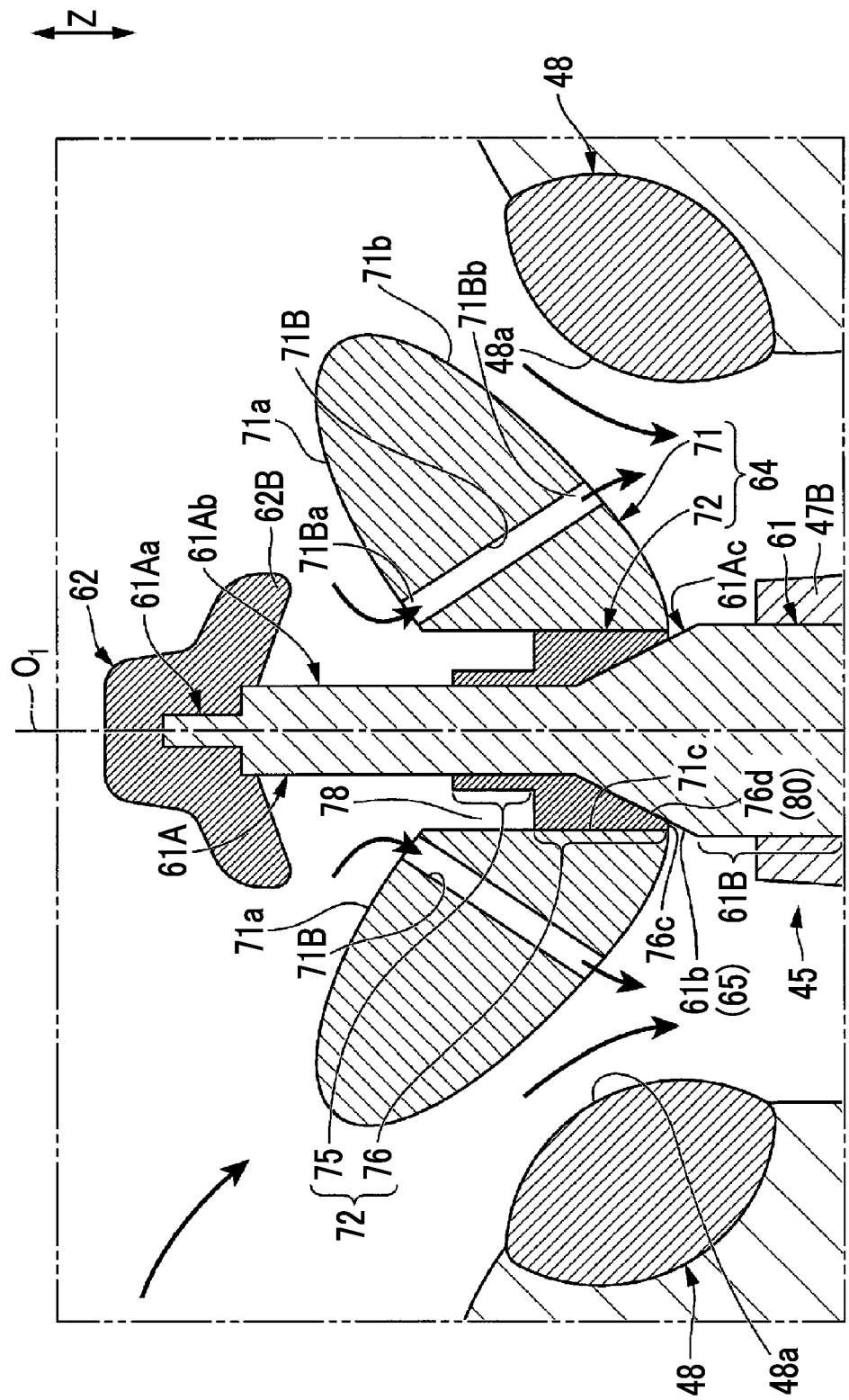
FIG. 4 is a view schematically illustrating a state in which the slave valve and the main valve constituting the steam valve illustrated in FIG. 3 are fully opened.
Figure 5:
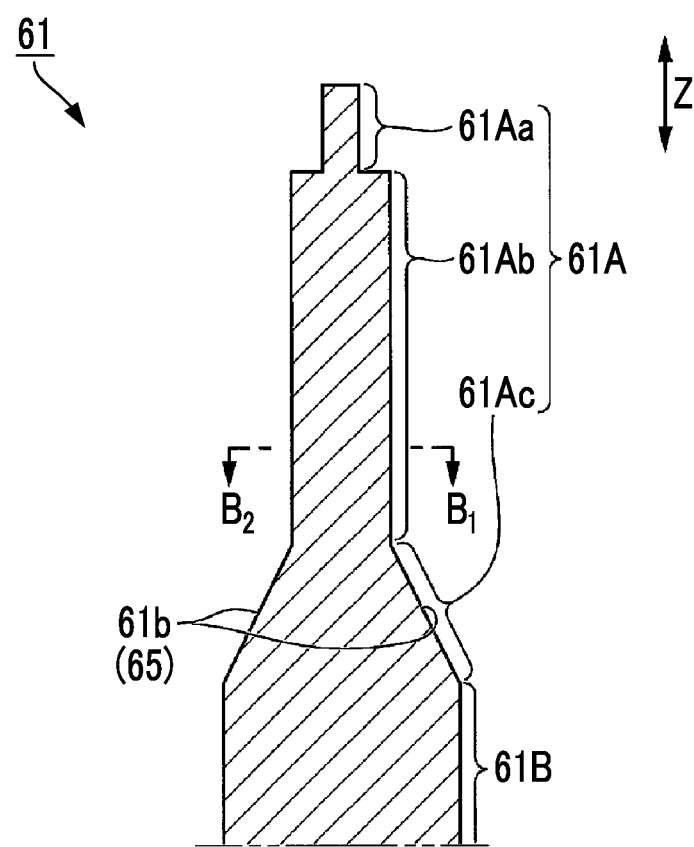
FIG. 5 is an enlarged cross-sectional view of a tip portion of a valve rod illustrated in FIG. 3.
Figure 6:
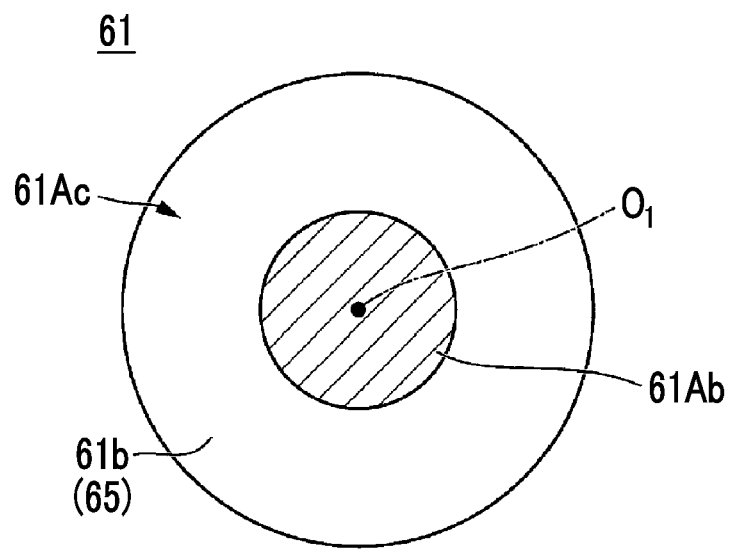
FIG. 6 is a cross-sectional view of the valve rod illustrated in FIG. 5, which is cut along line $B_1$-$B_2$.

On the other hand, as illustrated in FIG. 4, in a state in which the slave valve 62 is open (in a state in which the abutment part 62B of the slave valve 62 is separated from the valve seat surface 71a), a gap is formed between the slave valve 62 and the main valve 64. Therefore, the high-pressure steam flows into the inlet 71Ba of the through-hole 71B. The high-pressure steam flowing into the inlet 71Ba of the through-hole 71B is led out to the steam flow path 52 from the outlet 71Bb of the through-hole 71B.

The main valve 64 is disposed between the slave valve 62 and the rod-shaped portion 61B in a state in which the main valve is inserted into the valve rod 61. The main valve 64 has the main valve body 71 and a bush 72.

The main valve body 71 has a V shape as viewed in a vertical cross-section. The main valve body 71 has a penetrating portion 71A, a valve seat surface 71a, an abutment surface 71b, an inner peripheral surface 71c, and a plurality of through-holes 71B.

The penetrating portion 71A is formed so as to penetrate a central portion of the main valve body 71 in the axis direction Z. The penetrating portion 71A is a columnar hole and is partitioned by the inner peripheral surface 71c.

The second valve rod portion 61Ab and the bush 72 are disposed in the penetrating portion 71A. The inner diameter of the penetrating portion 71A is set to such a size that the second valve rod portion 61Ab and the bush 72 can be disposed.

The valve seat surface 71a is a curved surface disposed on the slave valve 62 side (the tip side of the valve rod 61). The abutment part 62B of the slave valve 62 abuts against the surface of the valve seat surface 71a located outside the inlet 71Ba of the plurality of through-holes 71B.

The abutment surface 71b is a curved surface disposed on a base end side of the valve rod 61. In a state in which the main valve 64 is fully closed, an outer peripheral portion of the abutment surface 71b abuts against the valve seat surface 48a of the valve seat 48. In this state, the high-pressure steam does not flow to the downstream side of the valve seat 48.

In a state in which the main valve 64 is open, the abutment surface 71b and the valve seat surface 48a are separated from each other, and a gap is formed between the abutment surface 71b and the valve seat surface 48a. Therefore, the high-pressure steam flows to the downstream side of the valve seat 48.

The plurality of through-holes 71B are formed through the main valve body 71 so as to reach the abutment surface 71b from the valve seat surface 71a. The plurality of through-holes 71B are disposed in the circumferential direction of the main valve body 71.

Each through-hole 71B has an inlet 71Ba and an outlet 71Bb. The inlet 71Ba is formed in the valve seat surface 71a located inside an abutment position between the abutment part 62B and the valve seat surface 71a. When the slave valve 62 is opened and the gap is formed between the slave valve 62 and the main valve 64, the high-pressure steam flows into the through-hole 71B via the inlet 71Ba.

The outlet 71Bb is formed in the abutment surface 71b located further radially outside the axis $O_1$ than the formation position of the inlet 71Ba. The outlet 71Bb communicates with the steam flow path 52 located on the downstream side of the valve seat 48.

The through-hole 71B having the above configuration is inclined in the direction from the inlet 71Ba to the outlet 71Bb.

The bush 72 has a first bush portion 75 and a second bush portion 76.

The first bush portion 75 is disposed inside the main valve body 71. The first bush portion 75 has a tubular shape that surrounds an outer peripheral surface of the second valve rod portion 61Ab. An inner peripheral surface 75a of the first bush portion 75 is in contact with the outer peripheral surface of the second valve rod portion 61Ab in a state in which the first bush portion 75 is movable in the axis direction Z.

The first bush portion 75 faces the main valve body 71 in a state in which the first bush portion is separated from the main valve body 71 in the radial direction of the axis O. Accordingly, a ring-shaped space 78 is formed between the first bush portion 75 and the main valve body 71.

The second bush portion 76 is disposed inside the main valve body 71. The second bush portion 76 has a tubular shape that surrounds the outer peripheral surface of the second valve rod portion 61Ab located closer to the third valve rod portion 61Ac side than the first bush portion 75.

The second bush portion 76 is provided at an end of the ends of the first bush portion 75, which is located on the first inclined surface 61b side. The second bush portion 76 is configured integrally with the first bush portion 75.

The second bush portion 76 has an inner peripheral surface 76a, an outer peripheral surface 76b, end surfaces 76c and 76e, and the second inclined surface 76d.

The inner peripheral surface 76a is in contact with the outer peripheral surface of the second valve rod portion 61Ab in a state in which the second bush portion 76 is movable in the axis direction Z.

The second bush portion 76 is fixed to the main valve body 71 in a state in which the outer peripheral surface 76b and the inner peripheral surface 76a of the main valve body 71 are in contact with each other. The length of the outer peripheral surface 76b in the axis direction Z is shorter than the length of the inner peripheral surface 76a.

The end surface 76c is disposed on the third valve rod portion 61Ac side. The end surface 76c is a surface orthogonal to the axis direction Z. The end surface 76c is connected to the outer peripheral surface 76b.

The second inclined surface 76d is disposed on the valve rod 61 side so as to connect the inner peripheral surface 76a and the end surface 76c. The second inclined surface 76d is inclined such that the thickness of the second bush portion 76 in the radial direction becomes smaller from the first bush portion 75 toward the third valve rod portion 61Ac. The second inclined surface 76d is formed inside the portion of the second bush portion 76 located on the base end side of the valve rod 61.

The second inclined surface 76d is one tapered surface 80 formed continuously with respect to the circumferential direction of the main valve 64. The second inclined surface 76d is inclined in the same direction as the first inclined surface 61b.

The inclination angle $\theta_2$ of the second inclined surface 76d with respect to the axis $O_1$ is configured to be equal to the inclination angle $\theta_1$ of the first inclined surface 61b.

In a state in which the slave valve 62 and the main valve 64 are closed, the second inclined surface 76d is at a position away from the first inclined surface 61b. On the other hand, when the slave valve 62 and the main valve 64 are in a fully opened state, the valve rod 61 moves to the control valve 43 side, so that the second inclined surface 76d and the first inclined surface 61b abut against each other, and the main valve 64 is supported by the first inclined surface 61b.

An end surface 76e is disposed on the first bush portion 75 side. The end surface 76e is a surface orthogonal to the axis $O_1$. The end surface 76e is connected to the outer peripheral surface 76b.

The end surface 76e is a surface exposed to the space 78. The end surface 76e faces the slave valve 62 via the space 78 in the axis direction Z.

One end of the second steam supply pipe 16 is connected to an outlet of the high-pressure steam turbine 31, and the other end thereof is connected to an inlet of the medium-pressure steam turbine 32. The steam used in the high-pressure steam turbine 31 is led out to the second steam supply pipe 16.

The second steam supply pipe 16 is a pipe for supplying the steam used in the high-pressure steam turbine 31 to the medium-pressure steam turbine 32.

The reheater 18 is provided in the second steam supply pipe 16. The reheater 18 heats the steam discharged from the high-pressure steam turbine 31 to generate medium-pressure steam (hereinafter, referred to as "medium-pressure steam"). The generated medium-pressure steam is supplied to the downstream side of the reheater 18.

The stop valve 21 is provided in the portion of the second steam supply pipe 16 located on the downstream side of the reheater 18. The stop valve 21 has the same function as the stop valve 45 described earlier.

The control valve 22 is provided in the portion of the second steam supply pipe 16 located on the downstream side of the stop valve 21. The control valve 22 has the same function as the control valve 43 described earlier.

One end of the third steam supply pipe 25 is connected to an outlet of the medium-pressure steam turbine 32, and the other end thereof is connected to an inlet of the low-pressure steam turbine 33. Steam (hereinafter, referred to as "low-pressure steam") that has been reduced to a low pressure by being used in the medium-pressure steam turbine 32 is led out to the third steam supply pipe 25.

The low-pressure steam led out to the third steam supply pipe 25 is supplied into the low-pressure steam turbine 33.

The generator 26 is connected to one end portion of the rotor shaft 35. The generator 26 is driven by the rotational driving force of the steam turbine 10 transmitted via the rotor shaft 35.

According to the steam valve 14 of the first embodiment, the steam valve 14 has the tapered surface 65 that is the first inclined surface 61b which is formed on the outer peripheral surface of the second valve rod portion 61Ab and on which the outer diameter of the valve rod 61 is increased from the tip side of the valve rod 61 toward the base end side thereof, and a tapered surface 80 that is the second inclined surface 76d which is formed inside the main valve 64 located on the base end side of the valve rod 61 and inclined at an inclination angle $\theta_2$ having the same magnitude as the inclination angle $\theta_1$ of the first inclined surface 61b, and is configured such that the tapered surface 65 and the tapered surface 80 are separated from each other in a state in which the slave valve 62 and the main valve 64 are closed and the tapered surface 65 and the tapered surface 80 abut against each other when the slave valve 62 and the main valve 64 are in the fully opened state. Accordingly, when the slave valve and the main valve are fully opened, the main valve 64 can be supported by the tapered surface 65 in a state in which the axis $O_1$ of the valve rod 61 and the axis of the penetrating portion 71A are made to coincide with each other.

Accordingly, since it is possible to suppress the sliding of the main valve 64 with respect to the valve rod 61 in the axis direction Z, the wear of the stop valve 45 can be suppressed.

Additionally, according to the power generation system 1 of the first embodiment, the maintenance frequency of the steam valve 14 can be reduced by including the steam valve 14 capable of suppressing the wear of the stop valve 45. Therefore, the operation efficiency of the power generation system 1 can be improved.

Second Embodiment

A steam valve 85 according to a second embodiment of the present invention will be described with reference to FIGS. 8 to 11.

Figure 10:
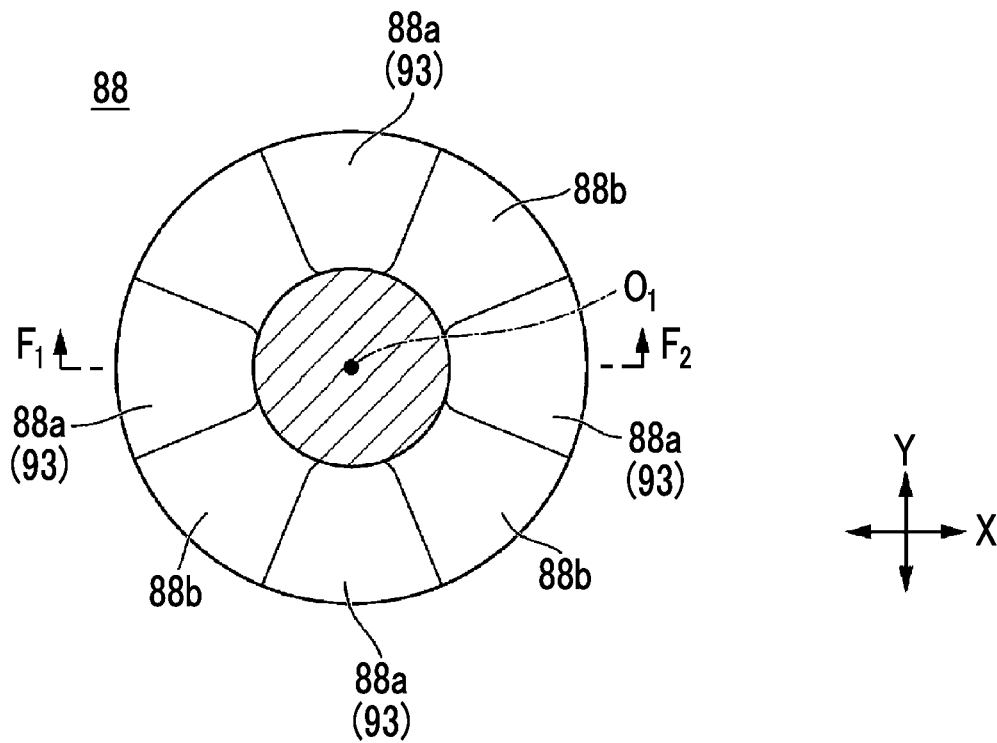
FIG. 10 is a cross-sectional view of a valve rod illustrated in FIG. 8 when the valve rod is cut along line $D_1$ to $D_2$.
Figure 11:
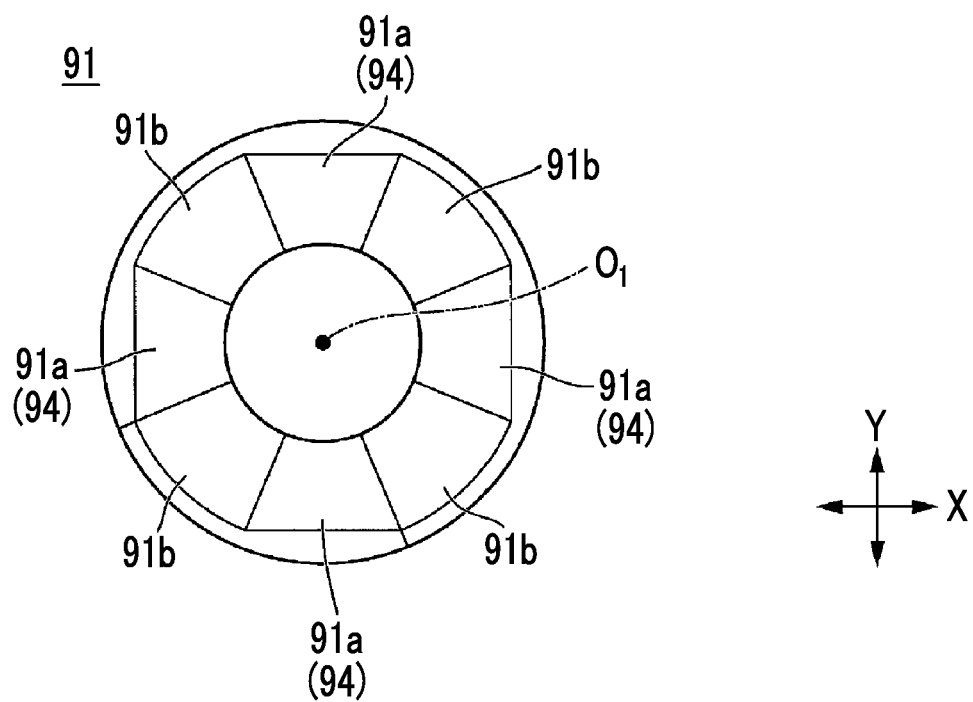
FIG. 11 is a view of the bush illustrated in FIG. 8 as viewed at E.

In FIG. 10, an X direction is orthogonal to a Z direction and indicates a direction in which two first inclined planar portions 93 are disposed, and a Y direction is orthogonal to the X direction and the Z direction and indicates a direction in which the remaining two first inclined planar portions 93 are disposed. Additionally, the cross-sectional position of line $F_1$-$F_2$ illustrated in FIG. 10 correspond to the cross section illustrated in FIG. 8. In FIG. 11, an X direction is orthogonal to a Z direction and indicates a direction in which two second inclined planar portions 94 are disposed, and a Y direction is orthogonal to the X direction and the Z direction and indicates a direction in which the remaining two second inclined planar portions 94 are disposed.

Figure 8:
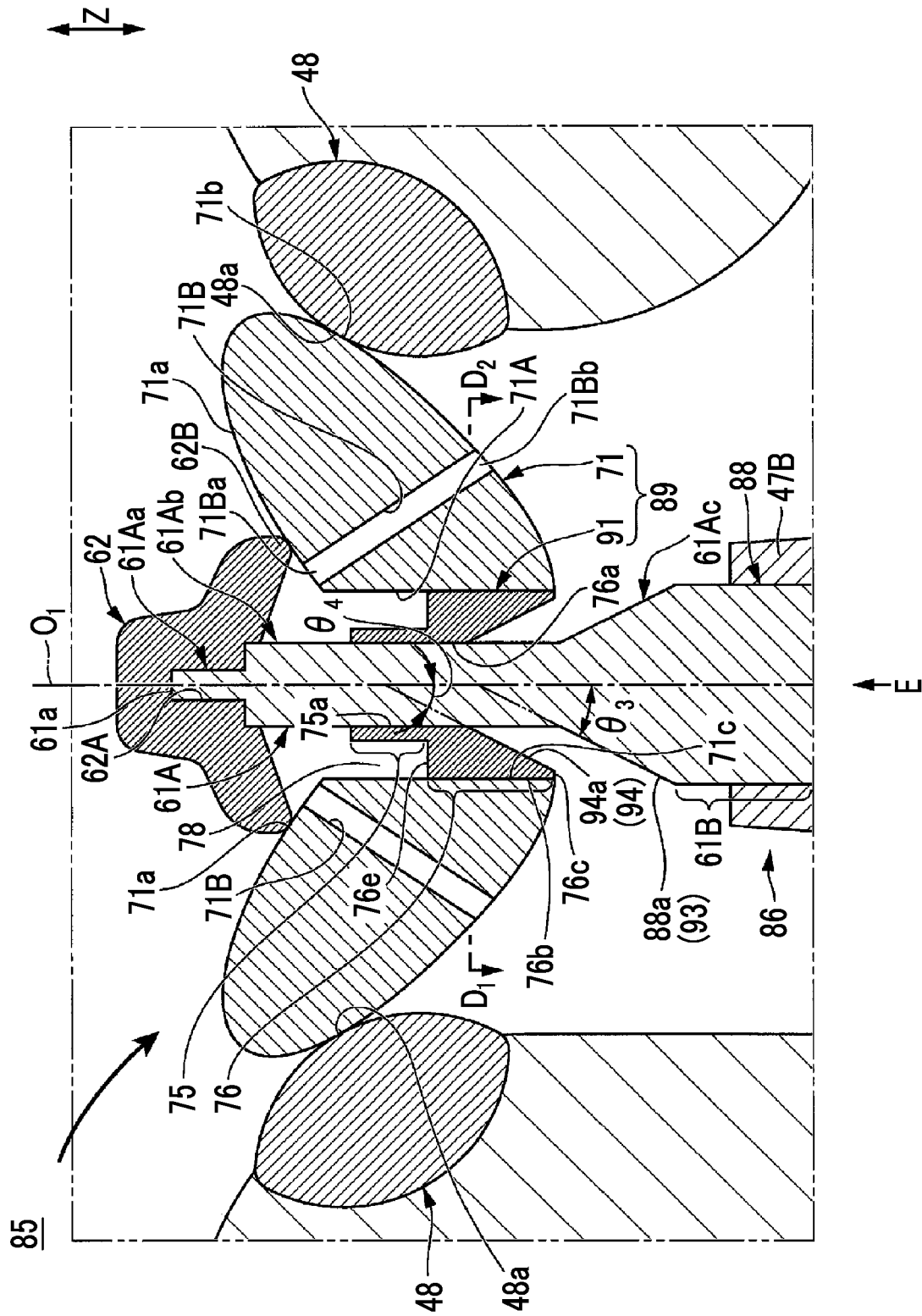
FIG. 8 is a cross-sectional view of principal sections of a steam valve according to a second embodiment of the present invention, and is a view schematically illustrating a state in which a slave valve, a main valve, and a control valve are fully closed.
Figure 9:
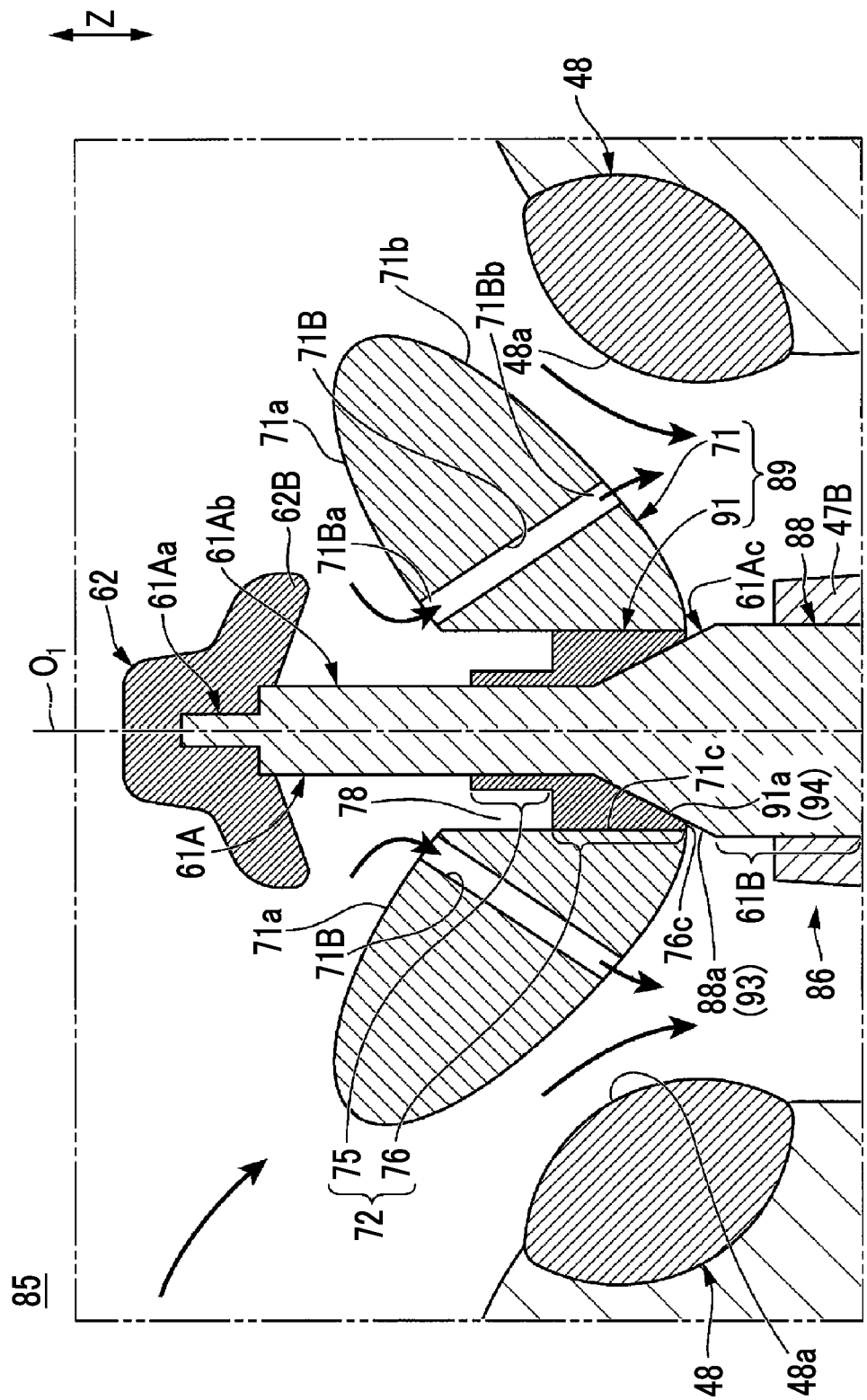
FIG. 9 is a view schematically illustrating a state in which the slave valve and the main valve constituting the steam valve illustrated in FIG. 8 are fully opened.

In FIG. 8, the same components as those of the structure illustrated in FIGS. 2 to 4 are designated by the same reference numerals. In FIGS. 8 to 11, the same components are designated by the same reference numerals.

The steam valve 85 is configured similarly to the steam valve 14 except that a stop valve 86 is provided instead of the stop valve 45 constituting the steam valve 14 of the first embodiment.

The stop valve 86 is configured similarly to the stop valve 45 except for having the valve rod 88 and the main valve 89 instead of the valve rod 61 and the main valve 64 constituting the stop valve 45 described in the first embodiment.

The valve rod 88 is configured similarly to the valve rod 61 except that having a first inclined surface 88a including two pairs of first inclined planar portions and four curved surfaces 88b instead of the first inclined surface 61b (tapered surface 65) constituting the valve rod 61 described in the first embodiment.

The two pairs of first inclined planar portions 93 are constituted of a total of four first inclined planar portions 93.

The four first inclined planar portions 93 are formed at an outer peripheral portion of the third valve rod portion 61Ac. Two first inclined planar portions 93 of the four first inclined planar portions 93 are disposed in the X direction, and the remaining two first inclined planar portions 93 are disposed in the Y direction.

Each curved surface 88b is disposed between the first inclined planar portions 93 adjacent to each other in the circumferential direction of the valve rod 88.

The four first inclined planar portions 93 are inclined in a direction in which the outer diameter of the third valve rod portion 61Ac is increased from a tip side of the valve rod 88 to a base end side thereof.

An inclination angle $\theta_3$ of each first inclined planar portion 93 with respect to the axis $O_1$ can be set to, for example, the same magnitude as the inclination angle $\theta_1$ described earlier.

The main valve 89 is configured similarly to the main valve 64 except for having a bush 91 instead of the bush 72 constituting the main valve 64 described in the first embodiment.

The bush 91 is configured similarly to the bush 72 except for having a second inclined surface 91a including four second inclined planar portions 94 instead of the second inclined surface 76d (tapered surface 65) formed on the bush 72.

Two second inclined planar portions 94 of the four second inclined planar portions 94 are disposed in the X direction with the axis $O_1$ interposed therebetween, and the remaining two second inclined planar portions 94 are disposed in the Y direction with the axis $O_1$ interposed therebetween.

Each second inclined planar portion 94 faces one first inclined planar portion 93 that is disposed in the direction of the axis $O_1$.

The four second inclined planar portions 94 are inclined such that an inclination angle $\theta_4$ with respect to the axis $O_1$ is equal to the inclination angle $\theta_3$.

Each curved surface 88b is disposed between the first inclined planar portions 93 adjacent to each other in the circumferential direction of the valve rod 88.

Figure 7:
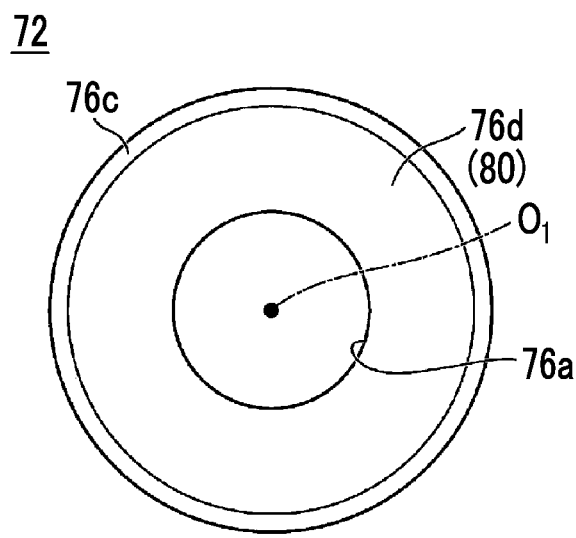
FIG. 7 is a view of a bush illustrated in FIG. 3 as viewed at C.

The second inclined planar portion 94 is located at a position away from the first inclined planar portion 93 in a state in which the slave valve 62 and the main valve 89 are closed (the state illustrated in FIG. 7).

On the other hand, when the slave valve 62 and the main valve 89 are in the fully opened state (the state illustrated in FIG. 8), the valve rod 88 moves to the control valve side. Accordingly, the second inclined planar portion 94 and the first inclined planar portion 93 abut against each other, and the main valve 89 is supported by the first inclined planar portion 93.

According to the steam valve 85 of the second embodiment, the steam valve has the four first inclined planar portions 93 that are formed on the valve rod 88 and formed in the X direction and the Y direction with the axis $O_1$ interposed therebetween, and the four second inclined planar portions 94 that are formed in the bush 91 and formed in the X direction and the Y direction with the axis $O_1$ interposed therebetween, and the first inclined planar portions and the second inclined planar portions are configured to abut against each other when the slave valve 62 and the main valve 64 are in the fully opened state. Accordingly, it is possible to suppress the sliding of the main valve 89 with respect to the valve rod 88 in the axis direction Z, and it is possible to suppress the rotation of the main valve 89 with respect to the valve rod 88. Accordingly, the wear of the stop valve 86 can be further suppressed.

In addition, in the second embodiment, as an example, a case where the two pairs of first and second inclined planar portions 93 and 94 are formed has been described as an example. However, the first and second inclined planar portions 93 and 94 may be provided in a pair or more, respectively, and are not limited to two pairs.

Third Embodiment

Figure 12:
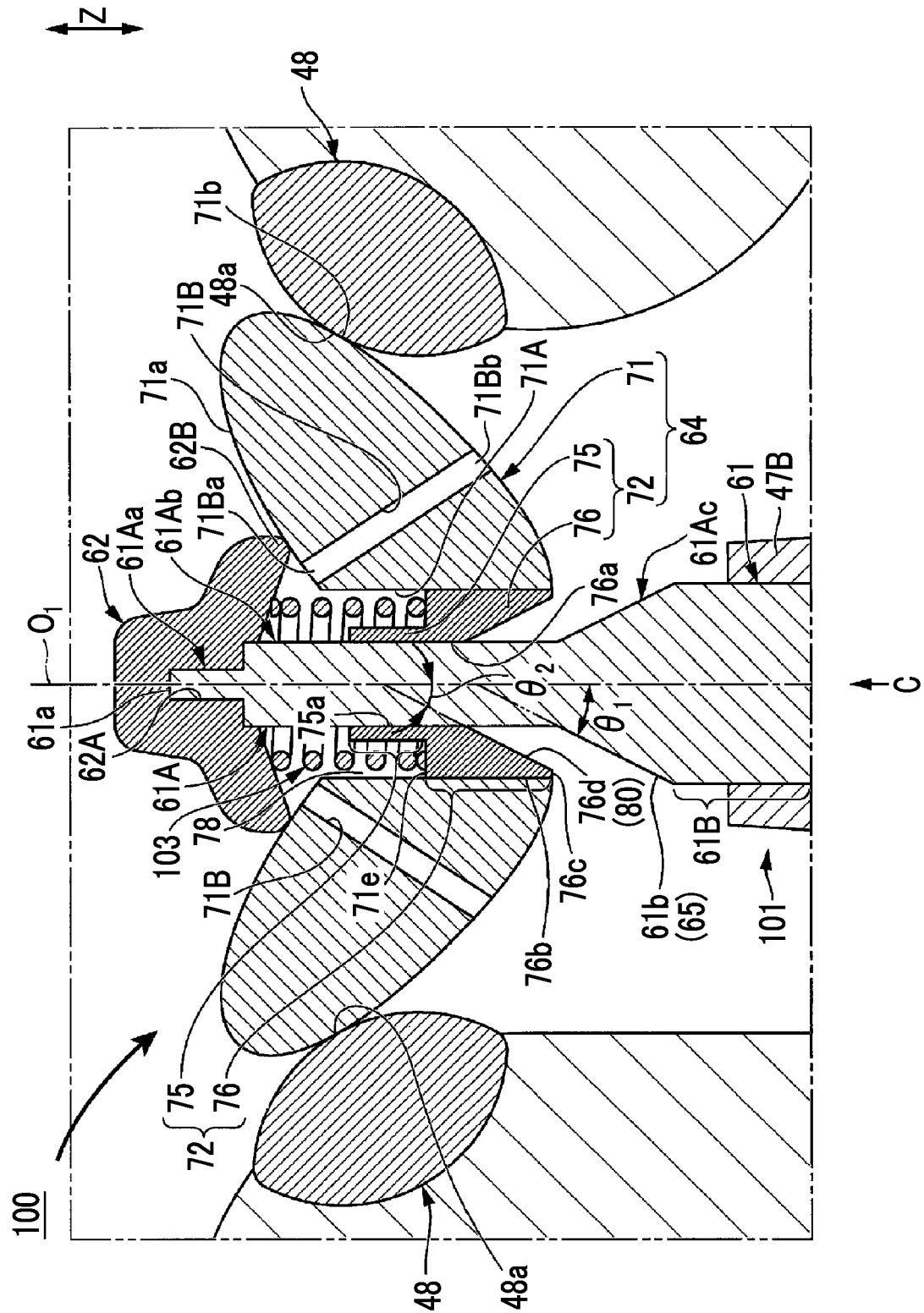
FIG. 12 is a cross-sectional view of principal sections of a steam valve according to a third embodiment of the present invention, and is a view schematically illustrating a state in which a slave valve, a main valve, and a control valve are fully closed.
Figure 13:
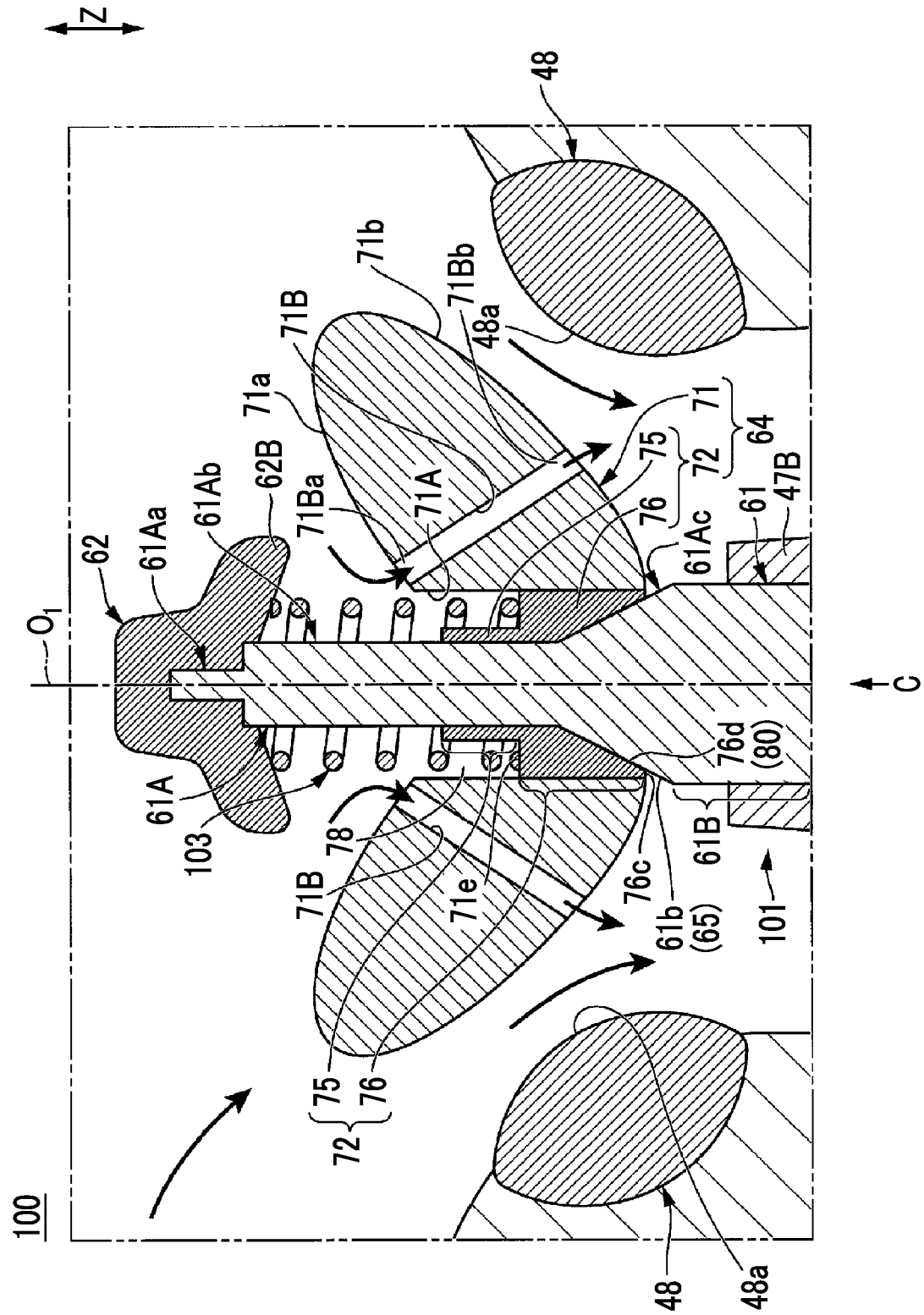
FIG. 13 is a view schematically illustrating a state in which the slave valve and the main valve constituting the steam valve illustrated in FIG. 12 are fully opened.

A steam valve 100 according to a third embodiment of the present invention will be described with reference to FIGS. 12 and 13. In FIG. 12, the same components as those of the structures illustrated in FIGS. 2 to 4 are designated by the same reference numerals. Additionally, in FIG. 13, the same components as those of the structure illustrated in FIG. 12 are designated by the same reference numerals.

The steam valve 100 is configured similarly to steam valve 14 except for having a stop valve 101 instead of the stop valve 45 constituting the steam valve 14 of the first embodiment.

The stop valve 101 is configured similarly to the stop valve 45 except for further including a compression coil spring 103 to the configuration of the stop valve 45.

The compression coil spring 103 is disposed between the slave valve 62 and the second bush portion 76. The end of the compression coil spring 103 on one side in the axis direction Z is fixed to the slave valve 62, and the end thereof on the other side in the axis direction Z is fixed to the end surface 76e of the second bush portion 76. A part of the compression coil spring 103 is disposed in the ring-shaped space 78.

The compression coil spring 103 having the above configuration is a spring for continuing applying a force in a direction in which the main valve 64 is separated from the slave valve 62 (a direction from the slave valve 62 toward the main valve 64).

According to the steam valve 100 of the third embodiment, the steam valve has the compression coil spring 103 that continues applying a force in the direction in which the main valve 64 is separated from the slave valve 62 (the direction from the slave valve 62 toward the main valve 64). Accordingly, When the slave valve 62 and the main valve 64 are fully opened, it is possible to make the first inclined surface 61b (the tapered surface 65) and the second inclined surface 76d (tapered surface 80) firmly abut against each other in a state in which the axis $O_1$ of the valve rod 61 and the axis of the penetrating portion 71A are made to coincide with each other, and the wear suppressing effect of the stop valve 101 can be further enhanced.

In addition, the compression coil spring 103 described in the third embodiment may be applied to the steam valve 85 described in the second embodiment. In this case, the same effects as those of the steam valve 100 of the third embodiment can be obtained.

Although the preferred embodiments of the present invention have been described in detail above, the present invention is not limited to such specific embodiments, and various modifications and changes can be made within the spirit of the present invention described within the claims.

INDUSTRIAL APPLICABILITY

The present invention is applicable to steam valves and power generation systems.

REFERENCE SIGNS LIST

1 Power generation system
10 Steam turbine
11 Boiler
12 First steam supply pipe
14, 85, 100 Steam valve
16 Second steam supply pipe
18 reheater
21, 45, 86, 101 Stop valve
22, 43 Control valve
25 Third steam supply pipe
26 Generator
31 High-pressure steam turbine
32 Medium-pressure steam turbine
33 Low-pressure steam turbine
35 Rotor shaft
41 Valve body
46A, 46B Actuator
47 Flow path partition portion
47A First guide member
47B Second guide member
48 Valve seat
48a, 71a Valve seat surface
52 Steam flow path
52A, 71Ba Inlet
52B, 71Bb Outlet
55, 61, 88 Valve rod
56 Control valve body
56A Tip
61a Tip surface
61A Tip portion
61Aa First valve rod portion
61Ab Second valve rod portion
61Ac Third valve rod portion
61b, 88a First inclined surface
61B Rod-shaped portion
62 Slave valve
62A Recessed portion
62B Abutment part
64, 89 Main valve
65, 80 Tapered surface
71 Main valve body
71A Penetrating portion
71b Abutment surface
71B Through-hole
71c, 75a, 76a Inner peripheral surface
72, 91 Bush
75 First bush portion
76 Second bush portion
76a Inner peripheral surface
76b Outer peripheral surface
76c, 76e End surface
76d, 91a Second inclined surface
78 Space
88b, 91b Curved surface
93 First inclined planar portion
94 Second inclined planar portion
103 Compression coil spring
A Region
$\theta_1$ to $\theta_4$ Inclination angle
$O_1$, $O_2$ Axis
Z Axis direction

The invention claimed is:

1. A steam valve comprising:

a valve body having a steam flow path through which steam flows, and a valve seat that is provided in the middle of the steam flow path and has an opening portion, and a stop valve having a valve rod that extends in an axis direction in which an axis extends and is movable forward and backward in the axis direction, a slave valve that is provided at a tip of the valve rod in a tip portion of the valve rod, and a main valve that includes a penetrating portion, into which a portion located closer to a base end side of the valve rod than the tip is inserted, in the tip portion of the valve rod, closes the steam flow path by abutting against the valve seat, and is formed with a through-hole into which the steam flows when the slave valve is opened, wherein the main valve functions as a valve seat of the slave valve, is not fixed to the valve rod, and is configured to be movable forward and backward in the axis direction, a first inclined surface is formed on the tip portion of the valve rod so that an outer diameter of the valve rod is increased from a tip side of the valve rod toward the base end side of the valve rod, a second inclined surface that is inclined at the same inclination angle as the first inclined surface is formed inside a portion of the main valve located on the base end side of the valve rod, the first inclined surface and the second inclined surface are separated from each other in a state in which the slave valve and the main valve are closed, the first inclined surface and the second inclined surface abut against each other when the slave valve and the main valve are in a fully opened state, the first inclined surface includes two pairs of first inclined planar portions and four curved surfaces, that is disposed with the axis interposed therebetween, and the second inclined surface has two pairs of second inclined planar portions that abut against the two pairs of the first inclined planar portions when the slave valve and the main valve are in a fully opened state.

2. The steam valve according to claim 1, wherein the main valve has a main valve body that abuts against the valve seat, and a tubular bush that is disposed inside the main valve body, and the second inclined surface is formed on the bush.

3. The steam valve according to claim 1, further comprising:

a compression coil spring that is provided between the slave valve and the main valve in the axis direction, wherein one end of the compression coil spring in the axis direction is connected to the slave valve and the other end thereof in the axis direction is connected to the main valve.

4. The steam valve according to claim 3, wherein the main valve has a main valve body that abuts against the valve seat, and a tubular bush that is disposed inside the main valve body, and the second inclined surface is formed on the bush, and the other end of the compression coil spring in the axis direction is connected to the bush.

5. The steam valve according to claim 1, wherein the slave valve is fixed to the tip of the valve rod.

6. The steam valve according to claim 1, further comprising:

a control valve that is disposed to face the stop valve in the axis direction and is capable of abutting against the valve seat at a position outside a position of the valve seat against which the main valve abuts.

7. A power generation system comprising:

the steam valve according to claim 1;

a boiler that generates steam;

a steam turbine that is driven by the steam; and a steam supply pipe that connects the boiler and the steam turbine to each other and supplies the steam to the steam turbine, wherein the steam valve is provided in the steam supply pipe.

\* \* \* \* \*